3,455,839
METHOD FOR REDUCING OR PREVENTING FOAM IN LIQUID MEDIUMS
Lawrence A. Rauner, Midland, Mich., assignor to Dow Corning Corporation, Midland, Mich., a corporation of Michigan
No Drawing. Filed Feb. 16, 1966, Ser. No. 527,734
Int. Cl. B01d *19/04, 19/02*
U.S. Cl. 252—321                                                4 Claims

ABSTRACT OF THE DISCLOSURE

A method for defoaming aqueous systems by incorporating therein a sufficient amount, i.e., one drop per 100 ml. of the aqueous system, of a defoaming agent. The defoaming agent is a mixture of a polydimethylsiloxane fluid, a siloxane resin, and a silica aerogel. Illustrative of a specific defoaming agent is a mixture of 100 parts of a dimethylpolysiloxane fluid having a viscosity of 350 cs. at 25° C., 10 parts of a siloxane resin composed of $(CH_3)_3SiO_{1/2}$ units and $SiO_2$ units in which the ratio of the $(CH_3)_3SiO_{1/2}$ units to $SiO_2$ units is within the range of from 0.6/1 to 1.2/1, and 3 parts of a silica aerogel.

---

This invention relates to a method for the treatment of aqueous systems which possess foaming properties. It is particularly concerned with a composition that can be utilized as a defoamer and antifoamer, a small amount of which inhibits or reduces undesirable foaming when dispersed in a liquid ordinarily disposed to foam formation.

Foaming or frothing is frequently encountered at the surface of liquids, due to the entrapping of various vapors. Aqueous alkaline solutions such as soap solutions are particularly apt to foam, especially when heated under reduced pressure or when agitated to any extent. Typical examples of serious foaming problems in industry include evaporation of alkaline black liquor in the paper industry; concentration of synthetic rubber latices; steam distillation of emulsions of butadiene-styrene copolymers; use of cutting oil emulsions in the metal working industry; use of emulsion-type paints, sugar refining, oil-well pumping, textile dyeing, sewage disposal, food preparation, and conversion of ores refined by flotation, among others.

It is well known that organosiloxane polymers, e.g. dihydrocarbon siloxanes and dihydrocarbon silicates often exhibit foam-depressing characteristics, however, they are not always satisfactory and in many cases are of limited utility.

It is an object of this invention to provide a method for inhibiting the foaming and frothing of aqueous systems that display this characteristic which is superior to all other methods heretofore available.

It is a further object of this invention to provide a composition that is effective in reducing or preventing undesirable foam in aqueous systems that can be compounded by considerably more simple production methods that results in a lower cost basis.

It is still a further object of this invention to provide a novel method for achieving the above advantages that results in improved product performance.

The nature of this invention as well as other objects and advantages thereof will be readily apparent from consideration of the following specification.

This invention relates to a method for reducing and preventing the foaming properties of aqueous systems which comprises incorporating therein a mixture consisting essentially of (A) A polydimethylsiloxane fluid having a viscosity in the range of from 20 cs. to 1500 cs. at 25° C., (B) A siloxane resin composed of $(CH_3)_3SiO_{1/2}$ units and $SiO_2$ units in which the ratio of the $(CH_3)_3SiO_{1/2}$ units to the $SiO_2$ units is within the range of from 0.6/1 to 1.2/1, and (C) A silica aerogel.

The liquid organopolysiloxane designated as component (A) above is well known and is a readily available commercial material. Its preparation simply consists of the conversion of dimethyldihalosilanes to siloxanes accomplished by normal hydrolysis and condensation methods. Said preparation of the liquid organopolysiloxane (A) is adequately described in a number of texts and numerous U.S. patents and any of the known methods of preparing such polymers can be employed.

The siloxane resin designated as component (B) above is equally well known and is also a readily available commercial material. These copolymers can be prepared by any of the methods known to the art such as by cohydrolysis and condensation of the corresponding silanes (e.g. $(CH_3)_3SiCl$ and $SiCl_4$), and other methods set forth in detail in countless U.S. patents.

The silica designated as compound (C) above is a finely-divided silica aerogel. The silica aerogel employed in the composition of this invention can be prepared by displacing water from a hydrogel in such a manner as to avoid excessive shrinking or crushing of the cellular structure of the material. A method of preparing silica aerogel, which method consists essentially in displacing water from silica gel with a low boiling organic liquid such as ethyl alcohol or diethyl ether, heating the treated gel in an autoclave to approximately the critical temperature of the organic liquid, releasing vapors of the latter from the autoclave and finally evacuating the autoclave while hot and charged with the residual gel, is described by S. S. Kistler in "J Phys. Chem." 36, 52–64 (1932). Finely-divided silica aerogel which is quite suitable for use in this invention is commercially available.

The above compositions can be easily and readily prepared by an appropriate admixture of the three necessary ingredients. The best method is to simply charge the polydimethylsiloxane fluid and siloxane resin (100 percent solids) to an appropriate flask containing a means for agitation and heating to effect a solution of the two components. The heating occurs at a temperature within a range of from 70° to 120° C., for a period of from 1 to 3 hours. Following this, the silica is added, agitation continues, and the heat is increased to within a range of from 130° to 175° C. for a period of approximately 2 hours. The product is then appropriately transferred to the necessary containers.

It is to be noted, that for the successful practice of this invention, the above order of admixture, heating temperatures, and the periods of time are not critical. Thus, all three ingredients can be admixed prior to the heating operation or any possible combination can be admixed and heated following by addition of the third ingredient. Therefore, it is possible to first mix the siloxane resin and silica aerogel then subsequently add the polydimethylsiloxane fluid, or mix the polydimethylsiloxane fluid and silica aerogel followed by addition of the siloxane resin. Also, time of heating and the temperature can vary. For example, it is possible to prepare the composition at room temperature, particularly when mechanical means of agitation are introduced, however due to obvious expediency, other methods are normally employed. Hence, for optimum and most practicable results it is preferred that the procedure initially described above be followed.

It is to be further noted that the viscosity of the polydimethylsiloxane fluid is not critical with the exception that it must be within a range of from 20 cs. to 1500 cs. at 25° C. Although when fluids of lower viscosity are used, the defoaming performance of the final dispersion is not deleteriously affected, fluids of higher viscosity, e.g. 150 cs. to 350 cs. at 25° C., are to be preferred since if the composition must stand for an appreciable length of time prior to use when lower viscosity fluids are employed, the silica has a tendency to settle out of solution.

Although it is not critical, it is preferred that the siloxane resin be one of low molecular weight and contain some hydroxyl radicals, but the hydroxyl content should be low, e.g. less than 1% by weight. Resins of this type are particularly suitable since they enhance solubility of the essential ingredients.

The preferred proportions of the siloxane resin and silica is respectively 5 to 20 parts and 1 to 5 parts per 100 parts of polydimethylsiloxane fluid to obtain best results, however 5 to 50 parts of siloxane resin and 1 to 10 parts of silica per 100 parts of polydimethylsiloxane fluid can be effectively employed while achieving significant results.

It is to be noted that the quantity of defoaming and antifoaming agent to be introduced to the liquid medium presenting foaming problems is not critical with the exception that it must be incorporated in sufficient amount to effectively collapse the foam. For purposes of this invention, approximately one drop of agent per 100 ml. of liquid medium ordinarily will suffice. The use of larger amounts of the agent is not precluded, however both from an economical and practical standpoint, the proportions related above are sufficient and provides significant results.

Depending upon the specific mode of application, the compositions of this invention can act either as a defoamer or an anti-foamer. Defoaming agents are foam reducers or palliatives whereas antifoaming agents are foam-prevention materials. Thus, where foam is present in a particular fluid medium and it is desired that said foaming be reduced, addition of an appropriate amount of the compositions of this invention will inhibit further foaming and reduce the foaming present at that time. In addition, where any foaming must be prevented before it commences, the addition of the compositions of this invention during the preparation of the fluid medium will retard the anticipated foaming that would ordinarily occur.

In order that those skilled in the art can better understand how the present invention can be practiced, the following examples are given by way of illustration and not by way of limitation.

All parts and percents referred to herein are by weight and all viscosities measured at 25° C. unless otherwise indicated.

In the following examples, defoaming ability was tested as follows: 100 cc. of a 0.1 percent solution of a polyalkylene derivative of sorbitan monooleate, a commercially available surface active agent, was placed in an 8 ounce round bottle. One drop of the foam control agent was placed in the center of the solution. Then a cap was placed on the bottle, the bottle shaken ten times and visual observation of the time for the foam to break so the surface could be seen was noted. In addition, another testing method comprised adding to a clean, eight-ounce bottle, 100 ml. of a 1 percent solution of a commercially available surface active agent, alkylphenoxypolyethoxyethanol in water and 0.5 ml. of the defoaming and antifoaming agent. The bottle was then placed in a vertical position on a Burrell wrist action shaker model BB using number 10 position for maximum stroke. The bottle was shaken for 10 seconds and the length in time for the foam to collapse was determined and recorded.

Example 1

100 parts of a polydimethylsiloxane fluid having a viscosity of 350 cs. and 10 parts of a siloxane resin composed of $(CH_3)_3SiO_{1/2}$ units and $SiO_2$ units in which the ratio of the $(CH_3)_3SiO_{1/2}$ units to $SiO_2$ units is within the range of from 0.6/1 to 1.2/1 were charged to a one liter, three-necked flask provided with a thermometer and a mechanically driven agitator. The agitation was carried out at low speeds to prevent splashing and loss of materials. The above mixture was heated for 2 to 3 hours at an approximate temperature of 100° C. to effect a solution. The silica aerogel was then added and further agitation and heating continued over a slightly higher temperature of approximately 150° C. Upon testing and visual observation, the foam broke within 5 seconds.

Example 2

When the following parts of a siloxane resin composed of $(CH_3)_3SiO_{1/2}$ units and $SiO_2$ units in which the ratio of $(CH_3)_3SiO_{1/2}$ units to $SiO_2$ units is within a range of from 0.6/1 to 1.2/1 and silica aerogel was substituted for the corresponding parts in Example 1, per 100 parts of a polydimethylsiloxane fluid, equivalent results were obtained.

| Fluid | Resin | Silica |
| --- | --- | --- |
| 100 | 50 | 1 |
| 100 | 40 | 2 |
| 100 | 30 | 8 |
| 100 | 20 | 6 |
| 100 | 10 | 5 |
| 100 | 5 | 10 |

Example 3

The procedures of Example 1 were repeated with the exception that initial heating of the dimethylpolysiloxane fluid and siloxane resin was conducted within a range of from 70° C. to 120° C. After addition of the silica, the heating was conducted within a range of from 130° C. to 180° C. Equivalent results were obtained.

Example 4

When a polydimethylsiloxane fluid having a viscosity of 20 cs., 50 cs., 100 cs., 200 cs., 350 cs., 500 cs., 800 cs., 1,000 cs., 1,200 cs., and 1,500 cs. was substituted for the corresponding fluid of Example 1, substantially equivalent results were achieved.

Example 5

When the composition of Example 1 was added to the steam distillate of emulsions of butadiene-styrene copolymers, emulsified paints, textile dyeing procedures, food preparation procedures, and sewage disposal procedures that exhibited undesirable foaming, it is visually observed that the foam collapsed in less than a minute.

That which is claimed is:
1. A method for reducing and preventing foaming properties of aqueous systems which comprises incorporating therein a mixture consisting essentially of
   (A) 10 parts by weight of a polydimethylsiloxane fluid having a viscosity in the range of from 20 cs. to 1500 cs. at 25° C.,
(B) 5 to 50 parts by weight of a siloxane resin composed of $(CH_3)_3SiO_{1/2}$ units and $SiO_2$ units in which the ratio of the $(CH_3)_3SiO_{1/2}$ units to the $SiO_2$ units is within the range of from 0.6/1 to 1.2/1, and
(C) 1 to 10 parts by weight of a silica aerogel.

2. The method as recited in claim 1 in which (A) is 100 parts, (B) is 5 to 20 parts, and (C) is 2 to 5 parts, all parts being on a weight basis.

3. The method as recited in claim 1 in which (A) is 100 parts, (B) is 10 parts, and (C) is 3 parts, all parts being on a weight basis.

4. The method as recited in claim 3 wherein (A) has a viscosity of 350 cs. at 25° C.

References Cited

UNITED STATES PATENTS

| | | | |
|---|---|---|---|
| 2,829,112 | 4/1958 | Solomon | 252—358 |
| 2,843,551 | 7/1958 | Leonard et al. | 252—358 |
| 3,235,509 | 2/1966 | Nitzsche et al. | 252—358 |

RICHARD D. LOVERING, Primary Examiner

U.S. Cl. X.R.

252—358

U.S. PATENT OFFICE
UNITED STATES PATENT OFFICE
CERTIFICATE OF CORRECTION

Patent No. 3,455,839          Dated: July 15, 1969

Lawrence A. Rauner

It is certified that error appears in the above-identified patent and that said Letters Patent are hereby corrected as shown below:

Column 4, line 75, "10" should read --100--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents